United States Patent
Nichols et al.

(10) Patent No.: US 8,089,404 B2
(45) Date of Patent: Jan. 3, 2012

(54) PARTITIONED APERTURE ARRAY ANTENNA

(75) Inventors: Richard W. Nichols, Manhattan Beach, CA (US); James S. Mason, Richardson, TX (US); Gilbert M. Shows, Plano, TX (US); Joel C. Roper, Plano, TX (US); Raymond D. Eppich, Plano, TX (US); Gustavo A. Burnum, Athens, GA (US)

(73) Assignee: Raytheon Company, Waltham, MA (US)

( * ) Notice: Subject to any disclaimer, the term of this patent is extended or adjusted under 35 U.S.C. 154(b) by 416 days.

(21) Appl. No.: 12/283,373

(22) Filed: Sep. 11, 2008

(65) Prior Publication Data

US 2010/0060517 A1    Mar. 11, 2010

(51) Int. Cl.
*H01Q 3/00* (2006.01)
*G01S 19/46* (2010.01)
*H04B 7/185* (2006.01)

(52) U.S. Cl. .................. 342/368; 342/357.29; 342/354; 342/372

(58) Field of Classification Search ............ 342/81, 342/157, 354, 368, 372, 374, 357.29, 357.42, 342/357.48
See application file for complete search history.

(56) References Cited

U.S. PATENT DOCUMENTS

| | | | | |
|---|---|---|---|---|
| 4,849,763 | A * | 7/1989 | DuFort | 342/372 |
| 5,351,053 | A * | 9/1994 | Wicks et al. | 342/158 |
| 5,493,305 | A * | 2/1996 | Wooldridge et al. | 342/368 |
| 6,208,287 | B1 * | 3/2001 | Sikina et al. | 342/174 |
| 7,425,928 | B2 * | 9/2008 | Chiang et al. | 343/754 |
| 7,474,263 | B1 * | 1/2009 | Garfinkle et al. | 342/373 |
| 2001/0033249 | A1 * | 10/2001 | Endo et al. | 343/713 |

* cited by examiner

*Primary Examiner* — Dao Phan
(74) *Attorney, Agent, or Firm* — Lucy Lubashev

(57) ABSTRACT

A partitioned aperture array antenna. The novel antenna includes a first subarray having a first number of antenna elements equipped with transmit functionality and a second subarray having a second number of antenna elements equipped with receive functionality, wherein the first and second numbers are not equal and the first and second subarrays have at least one common antenna element. In an illustrative embodiment, the first subarray includes a transmit circuit coupled to each antenna element in the first subarray for controlling a relative transmit phase of the antenna element to steer an overall antenna transmit beam, and the second subarray includes a receive circuit coupled to each antenna element in the second subarray for controlling a relative receive phase of the antenna element to steer an overall antenna receive beam.

37 Claims, 3 Drawing Sheets

PARTITIONED APERTURE ARRAY ANTENNA

BACKGROUND OF THE INVENTION

1. Field of the Invention

The present invention relates to radio frequency electronics. More specifically, the present invention relates to electronically scanned array antennas for satellite communications.

2. Description of the Related Art

Conventional satellite communication antennas have typically relied on mechanical steering approaches using a "dish" antenna to establish and maintain a link with a satellite. A dish antenna typically includes a parabolic reflector dish and a feed element that couples RF (radio frequency) signals between the reflector dish and a modem. The modem modulates data onto a carrier signal to provide a signal to be transmitted to the satellite by the antenna, and also demodulates a signal received from the satellite to extract encoded data.

For "communications on the move" or mobile applications in which the antenna is located on a moving platform such as a ground vehicle, airplane, or ship, the antenna needs to be capable of scanning in different directions in order to locate and then follow a satellite as the platform moves. This is typically accomplished by mounting the dish antenna on a gimbal and mechanically steering the gimbal to point the antenna in the desired direction.

When it is desired to communicate with a satellite from a vehicle that is moving, the use of mechanically steered dish antennas presents a variety of mechanical problems related to the motion of the vehicle over rough roads and uneven terrain, or during periods of high maneuverability. Stabilization techniques are commonly used that place the antenna on a platform that is mechanically stabilized; however, these approaches often can not provide the stability required in highly dynamic maneuvers on uneven terrain, and also add cost and complexity to the system.

Mechanically steered antennas also include gimbal mechanisms, such as mechanical servos, drive motors, gears, drive belts, etc., that typically require significant amounts of time and expense for maintenance and may also break when subject to erratic movement. In addition, conventional dish antennas are typically large and bulky, making them more visible to radar detection.

An alternative to the conventional dish antenna is an electronically scanned array (ESA) or phased array antenna. An ESA includes an array of several individual radiating antenna elements whose relative phases are controlled such that the overall beam from the array radiates in a desired direction due to constructive and destructive interference between the individual elements. Phased arrays are typically low profile, robust to movement, and are capable of switching beam directions in fractions of a millisecond. However, conventional ESA antennas, which have been used predominantly in radar applications, are typically not suitable for use in mobile satellite communications applications due to their large size, heavy weight, and high cost. In particular, conventional ESA antennas cannot provide the desired receiver performance (i.e., the desired antenna gain-to-noise temperature ratio or G/T) in a small, low power package suitable for battery-powered, mobile applications.

Hence, a need exists in the art for an improved antenna for on-the-move satellite communications that offers low profile, lower power consumption, smaller size, and lower cost than prior approaches.

SUMMARY OF THE INVENTION

The need in the art is addressed by the partitioned aperture array antenna of the present invention. The novel antenna includes a first subarray having a first number of antenna elements equipped with transmit functionality and a second subarray having a second number of antenna elements equipped with receive functionality, wherein the first and second numbers are not equal and the first and second subarrays have at least one common antenna element. In an illustrative embodiment, the first subarray includes a transmit circuit coupled to each antenna element in the first subarray for controlling a relative transmit phase of the antenna element to steer an overall antenna transmit beam, and the second subarray includes a receive circuit coupled to each antenna element in the second subarray for controlling a relative receive phase of the antenna element to steer an overall antenna receive beam.

In an illustrative embodiment, the first subarray is a subset of the second subarray, and the second subarray includes the first subarray plus one or more additional antenna receive elements to extend the antenna aperture of the receive beam for increased G/T while minimizing the number of transmit circuits. In a preferred embodiment, the antenna also includes an antenna element adapted to receive Global Positioning System (GPS) signals and coupled to a GPS receiver. The antenna may also include an integrated orientation sensor for measuring the orientation of the antenna. Data from the GPS receiver and orientation sensor can be used to automatically determine the relative direction of a satellite.

DESCRIPTION OF THE INVENTION

Figure 1:
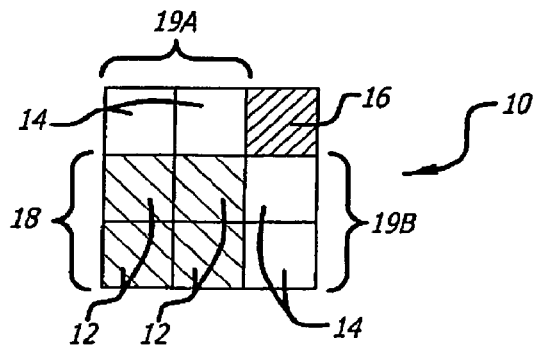
FIG. 1 is a simplified diagram of an antenna designed in accordance with an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In a co-pending patent application entitled "ACTIVE ELECTRONICALLY SCANNED ARRAY ANTENNA FOR SATELLITE COMMUNICATIONS", filed Oct. 22, 2008, by R. W. Nichols et al. Ser. No. 12/288,635, the teachings of which are incorporated herein by reference, an antenna for satellite communications is disclosed that uses an active electronically scanned array (AESA) with independently controlled transmit and receive channels for each radiating element. The transmit and receive channels each included a phase shifter for controlling the relative phases of each array element to form desired overall array transmit and receive beam patterns using electronic beam steering techniques. This allowed the antenna to transmit and receive in different directions at the same time.

The present teachings provide a smaller AESA antenna designed specifically for lower bandwidth transmission rates from mobile or fixed sites. The novel antenna uses a unique combination of modules to combine satellite transmit and receive elements, and GPS (global positioning system) and inertial navigation modules onto one array. In an illustrative embodiment, the antenna includes an active phased array having a limited number of antenna elements with both transmit and receive functionality, and a number of additional antenna elements with only receive capability for extending the antenna aperture for the receive beam. In a preferred embodiment, the antenna also includes a GPS receiver and antenna orientation sensors that can be used to automatically determine the relative direction of a satellite with which the phased array is attempting to communicate.

In many satellite communications applications, the desired receiver performance may require a larger antenna aperture (i.e., a larger number of array elements) than is required by the desired transmitter performance. Increasing the size of the antenna aperture improves both the receiver G/T and the transmitter EIRP (effective isotropic radiated power), but also increases cost and power consumption. A large contributor to power consumption is the high power amplifier (HPA) in the transmit channel of each antenna element. In accordance with the present teachings, the size of the antenna array is determined by the desired receiver G/T, but some antenna elements are only equipped with receive capability while others are equipped with both transmit and receive capability. By eliminating the transmit circuitry in some of the antenna elements, cost and power consumption can be reduced while still meeting the desired transmit and receive performance parameters.

For example, in an illustrative application, the desired transmitter EIRP can be achieved using only four antenna elements, but eight elements are needed to achieve the desired receiver G/T. In accordance with the present teachings, an antenna with four transmit/receive (T/R) elements and four additional receive-only elements can achieve the desired receive and transmit performance parameters while minimizing cost and power consumption. The illustrative antenna therefore uses four antenna elements to transmit and eight antenna elements to receive. Since the antenna uses a different number of antenna elements to transmit and receive, the transmit and receive beams of the antenna may have different shapes and/or sizes. The transmit and receive phases of a T/R element may therefore differ, even if the antenna is transmitting and receiving from the same satellite. This, however, is not a problem because the transmit and receive channels of the T/R modules are independently controlled.

FIG. 1 is a simplified diagram of an antenna 10 designed in accordance with an illustrative embodiment of the present invention. The novel antenna 10 is an AESA comprising a flat, planar (two-dimensional) array of patch antenna elements. Selected antenna elements 12 are integrated with T/R modules to provide both transmit and receive functionality, and other selected antenna elements 14 are integrated with receive-only modules to provide receive functionality only. The number of T/R elements 12 is chosen based on the number of antenna elements needed to meet desired transmit performance parameters, and the total number of T/R elements 12 and receive-only elements 14 is chosen based on the number of elements needed to meet desired receiver performance parameters. The antenna 10 may also include one or more elements 16 integrated with a GPS receiver for assisting a self-aligning capability in which the antenna 10 can automatically determine the relative direction of a satellite with which it is attempting to communicate.

In the illustrative embodiment of FIG. 1, the antenna 10 includes four T/R elements 12, four receive-only elements 14, and one GPS element 16. The nine elements 12, 14, and 16 are arranged in a square three element by three element array. The four T/R elements 12 are arranged in a two by two subarray 18. Two of the receive-only elements 14 form a first receive-only subarray 19A adjacent to a first side of the T/R subarray 18, and the remaining two receive-only elements 18 form a second receive-only subarray 19B adjacent to a second side of the T/R subarray 18, where the first and second sides of the T/R subarray 18 are contiguous. The remaining array space in the three by three array (in the corner between the two receive-only subarrays 19A and 19B) is the GPS element 16.

The T/R elements 12 and receive-only elements 14 form an active phased array having transmit and receive beams that are electronically steered by varying the relative phases of the individual elements. The transmitted signal is radiated by the T/R elements 12 only, and the received signal is received by both the T/R elements 12 and the receive-only elements 14. The T/R elements 12 each include a T/R circuit with independent transmit and receive channels that allow the transmit phase and the receive phase of the element 12 to be controlled independently.

Figure 2A:
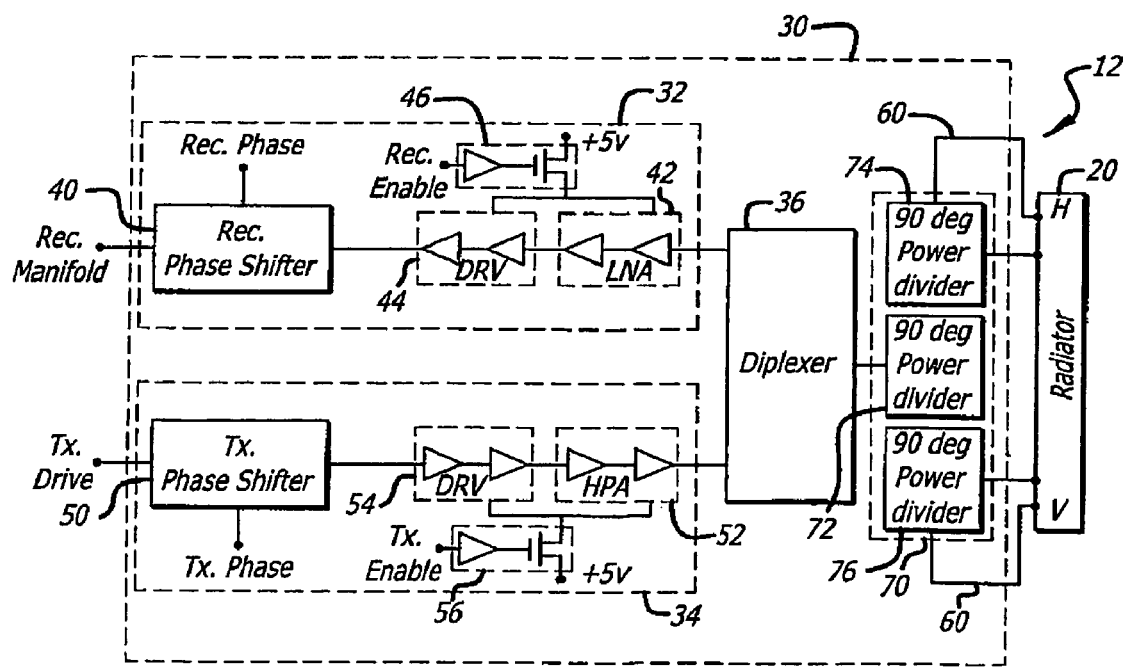
FIG. 2a is a simplified block diagram of a transmit/receive element designed in accordance with an illustrative embodiment of the present invention.

FIG. 2a is a simplified block diagram of a T/R element 12 designed in accordance with an illustrative embodiment of the present invention. Each T/R element 12 includes an individual antenna radiating element 20 and a transmit/receive (T/R) circuit 30 for controlling and driving the radiating element 20. This radiating element 20 is also a receiving element.

The T/R circuit 30 includes independently controlled receive and transmit channels 32 and 34, respectively. A diplexer 36 couples both the receive channel 32 and transmit channel 34 to the radiator element 20. The diplexer 36 implements frequency multiplexing such that signals in a first frequency band are coupled between the radiator 20 and the receive channel 32 while signals in a second frequency band are coupled between the radiator 20 and the transmit channel 34. This provides a full duplex system that can receive and transmit signals simultaneously. In an illustrative embodiment, the diplexer 36 is compatible with the transmit and receive frequency bands of the INMARSAT satellite network.

The receive channel 32 includes a phase shifter 40 for actively controlling the phase of a received signal from the radiating element 20. The phase shifter 40 also receives a control signal, labeled Rec. Phase in FIG. 2a, that controls the value of the phase shift of the receive antenna channel thereby creating the phase array effect for electronically steered beams. The phase shifted signal output by the phase shifter 40 is sent to a receive manifold that combines the received signals from each of the T/R elements 12 and receive-only elements 14 in the array 10.

The receive channel 32 also includes a low noise amplifier (LNA) 42 for amplifying a signal received from the radiator 20 (after filtering by the diplexer 36). After traveling the significant distance between the satellite and the antenna, a received signal is typically very low level and should be amplified by a LNA before being demodulated. In accordance with the present teachings, the LNA 42 is connected directly to the diplexer 36, as close to the radiating element 20 as possible in order to reduce system noise and provide the highest G/T, thereby allowing for a smaller overall antenna size (given a desired G/T). Optionally, the receive channel 32 may also include a driver amplifier 44 connected in series with the LNA 42 between the diplexer 36 and the phase shifter 40. In the illustrative embodiment, the LNA 42 and driver amplifier 44 are both coupled to a voltage supply (for example, a +5 V supply is shown in the illustrative embodiment of FIG. 2a) by a switch 46, which is controlled by a Rec. Enable control signal. By using the Rec. Enable control signal to turn the switch 46 on and off, the LNA 42 and driver amplifier 44 can be turned on and off, effectively controlling whether or not the radiator element 20 is active for the receive beam.

The transmit channel 34 includes a phase shifter 50 for actively controlling the phase of the transmitted signal from the radiating element 20. The input to the phase shifter 50 is the signal to be transmitted, which is provided by an RF distribution board that splits the transmit signal (provided by a modem) and sends the same signal to each of the T/R elements 12 of the array 10. The phase shifter 50 also receives a control signal, labeled Tx. Phase in FIG. 2, that controls the value of the phase shift.

The transmit channel 34 also includes a high power amplifier (HPA) 52 for amplifying the phase shifted signal output from the transmit phase shifter 50 to a power level appropriate for transmission. In an illustrative embodiment, the HPA 52 is a 2 Watt HPA, allowing the antenna 10 to achieve the required transmit power for high bandwidth interface to the INMARSAT BGAN I4 satellite with only four transmit elements. The amplified transmit signal output by the HPA 52 is coupled to the radiator 20 by the diplexer 36. In accordance with the present teachings, the HPA 52 is connected directly to the diplexer 36, as close to the radiating element 20 as possible in order to reduce loss in the system. Optionally, the transmit channel 34 may also include a driver amplifier 54 connected in series with the HPA 52 between the diplexer 36 and the phase shifter 50. In the illustrative embodiment, the HPA 52 and driver amplifier 54 are both coupled to a voltage supply (a +5 V supply is shown in FIG. 2a) by a switch 56, which is controlled by a Tx. Enable control signal. By using the Tx. Enable control signal to turn the switch 56 on and off, the HPA 52 and driver amplifier 54 can be turned on and off, effectively controlling whether or not the radiator element 20 is active for the transmit beam.

In a preferred embodiment, the radiator element 20 is aperture coupled to the diplexer 36, providing a connectorless integration with the T/R circuit 30. In this embodiment, the radiating element 20 is a patch antenna element that includes a metal patch disposed on a patch substrate over a ground plane, and the T/R circuit 30 includes one or more microstrip transmission lines 60 that couple signals between the diplexer 36 and the radiator patch 20 via apertures in the ground plane.

The T/R circuit 30 may also include some mechanism 70 for controlling the polarization of a signal transmitted or received by the radiating element 20. In an illustrative embodiment, the antenna 10 is configured to radiate right-hand circularly polarized (RHCP) waves and the polarization mechanism 70 includes one or more 90° power dividers or quadrature hybrid couplers. In this embodiment, the radiating element 20 is excited using four input feeds (i.e., four aperture-coupled transmission lines 60), in which each feed is 90° out of phase with respect to the other feeds. In the embodiment of FIG. 2a, the T/R module 30 includes three power dividers 72, 74, and 76. The first power divider 72 is coupled between the diplexer 36, the second power divider 74, and the third power divider 76. The second power divider 74 has two ports coupled to the two horizontal feeds (H) of the radiator 20. The third power divider 76 has two ports coupled to the two vertical feeds (V) of the radiator 20.

Figure 2B:
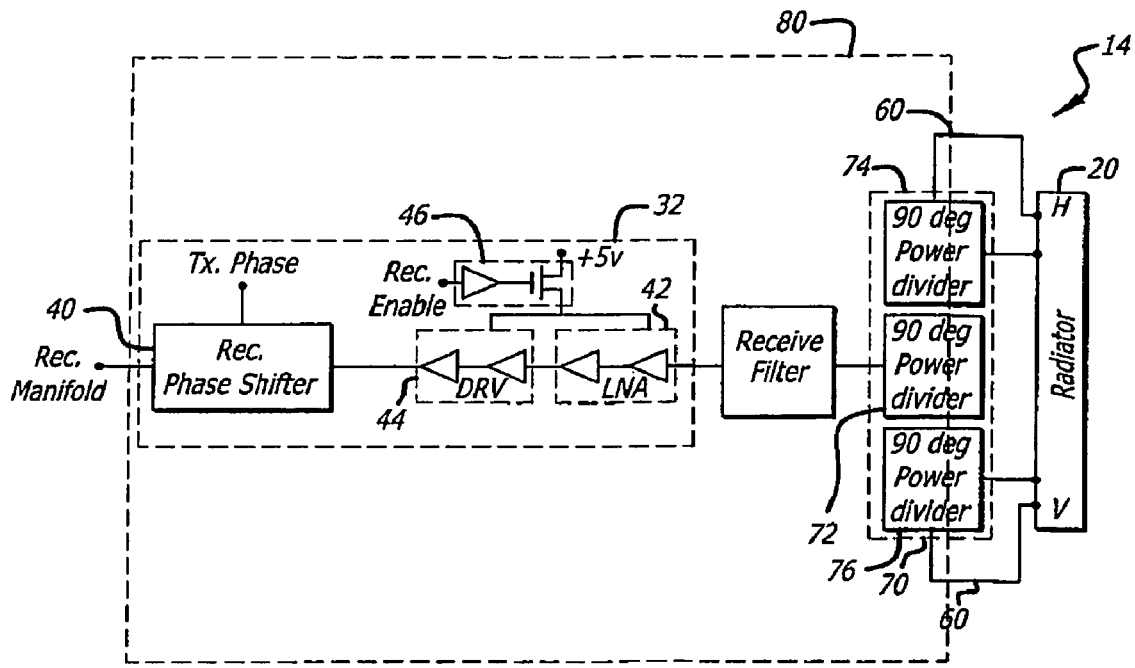
FIG. 2b is a simplified block diagram of a receive-only element designed in accordance with an illustrative embodiment of the present invention.

The receive-only elements 14 of the antenna 10 are identical to the T/R elements 12 except without the transmit channel 34 and the diplexer 36. FIG. 2b is a simplified block diagram of a receive-only element 14 designed in accordance with an illustrative embodiment of the present invention. Each receive-only element 14 includes an individual antenna radiating element 20 and a receive-only circuit 80 for controlling and driving the radiating element 20. The receive-only circuit 80 is identical to the T/R circuit 30 described above, but without the transmit channel 34 and the diplexer 36. The receive-only circuit 80 therefore includes a receive channel 32 that is aperture coupled to its radiating element 20 via transmission lines 60 and a polarization circuit 70. The receive channel 32 is identical to that of the T/R circuit 30 described above.

Figure 3:
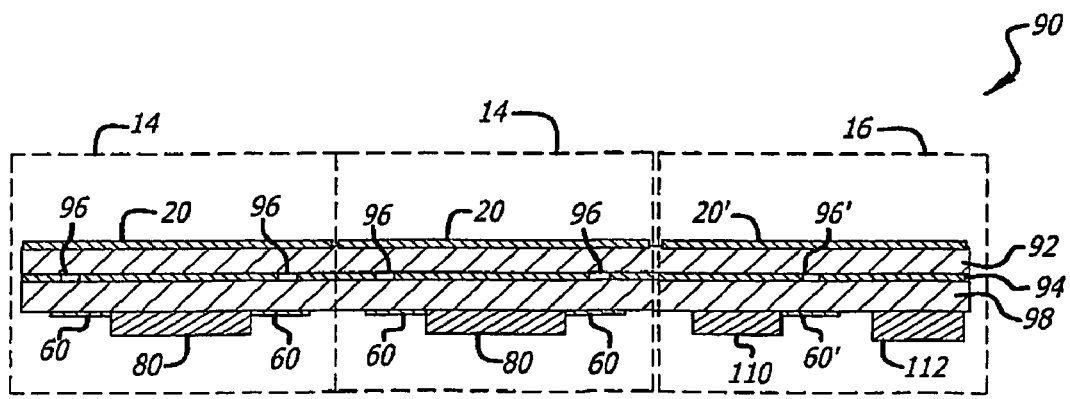
FIG. 3 is a simplified cross-sectional diagram of an integrated antenna/circuit board designed in accordance with an illustrative embodiment of the present invention.

In a preferred embodiment, the radiating elements and circuitry of the T/R elements 12, receive-only elements 14, and GPS element 16 are integrated onto a single antenna/circuit board. FIG. 3 is a simplified cross-sectional diagram of an integrated antenna/circuit board 90 designed in accordance with an illustrative embodiment of the present invention. The board 90 includes a plurality of metallic radiating patches 20 disposed on a patch substrate 92 (which may include air or any other suitable dielectric) over a ground plane 94.

In the illustrative embodiment, the board 90 includes nine radiating patches: eight patches 20 that are designed for satellite communications and coupled to either a T/R circuit 30 or a receive-only circuit 80 (to form a T/R element 12 or receive-only element 14, respectively), and one patch 20' that is designed for receiving GPS signals and coupled to a GPS receiver 110 (to form a GPS element 16). Only two receive-only elements 14 and the GPS element 16 are shown in the cross-sectional side view of FIG. 3. A T/R element 12 is identical to a receive-only element 14 except that a T/R circuit 30 is coupled to the patch 20 instead of a receive-only circuit 80.

In an illustrative embodiment, the antenna 10 is designed for use at L-band frequencies appropriate for communicating with the INMARSAT BGAN I-4 satellite network. Each radiating element 20 for the T/R modules 12 and receive-only modules 14 is a square patch having sides of approximately 3". GPS signals are also typically transmitted at L-band frequencies. The radiating patch 20' for the GPS element 16 can therefore be of the same size and shape as the radiating patches 20 for the phased array modules 12 and 14. For other applications, however, in which the antenna is communicating at different frequencies other than L-band, the GPS patch 20' may have a different size and/or shape than the ESA patches 20.

A circuit board substrate 98 is disposed next to the ground plane 94, parallel to the radiating patches 20 and the ground plane 94. The T/R circuits 30 and receive-only circuits 80 are implemented beneath their respective radiating patches 20 on the circuit substrate 98 opposite the ground plane 94 (using, for example, electronic components connected by printed circuit board traces). The ground plane 94 includes one or more apertures 96 under each patch 20, and each T/R circuit 30 and receive-only circuit 80 includes microstrip transmission lines 60 for coupling signals between the T/R circuit 30 or receive-only circuit 80 and its respective radiator patch 20 via its respective apertures 96. In a preferred embodiment, in order to minimize costs, the electronic components of the circuit board 90 (including, for example, diplexers, phase shifters, and amplifiers) are implemented using commercial off-the-shelf components with general linearity from UHF to 2.5 GHz.

Similarly, the GPS receiver 110 is integrated onto the circuit board 98 and coupled to the GPS radiator patch 20' by one or more transmission lines 60' via one or more ground plane apertures 96' located beneath the patch 20'. In the preferred embodiment, the GPS element 16 also includes antenna orientation sensors 112 integrated onto the circuit board 98. The antenna orientation sensors 112 may include, for example, but are not limited to, a north finding module and an electronic tilt sensor adapted to measure the tilt of the antenna/circuit board 90. The GPS receiver 110 and orientation sensors 112 may also be implemented using commercial off-the-shelf products. The antenna position and orientation obtained by the GPS receiver 110 and orientation sensors 112, respectively, can be used by a communication system to automatically point the phased array toward a visible satellite. Integrating the GPS receiver 110 and orientation sensors 112 onto the antenna board 90 directly reduces cost and keeps the antenna 10 as thin as possible for low profile applications.

Figure 4:
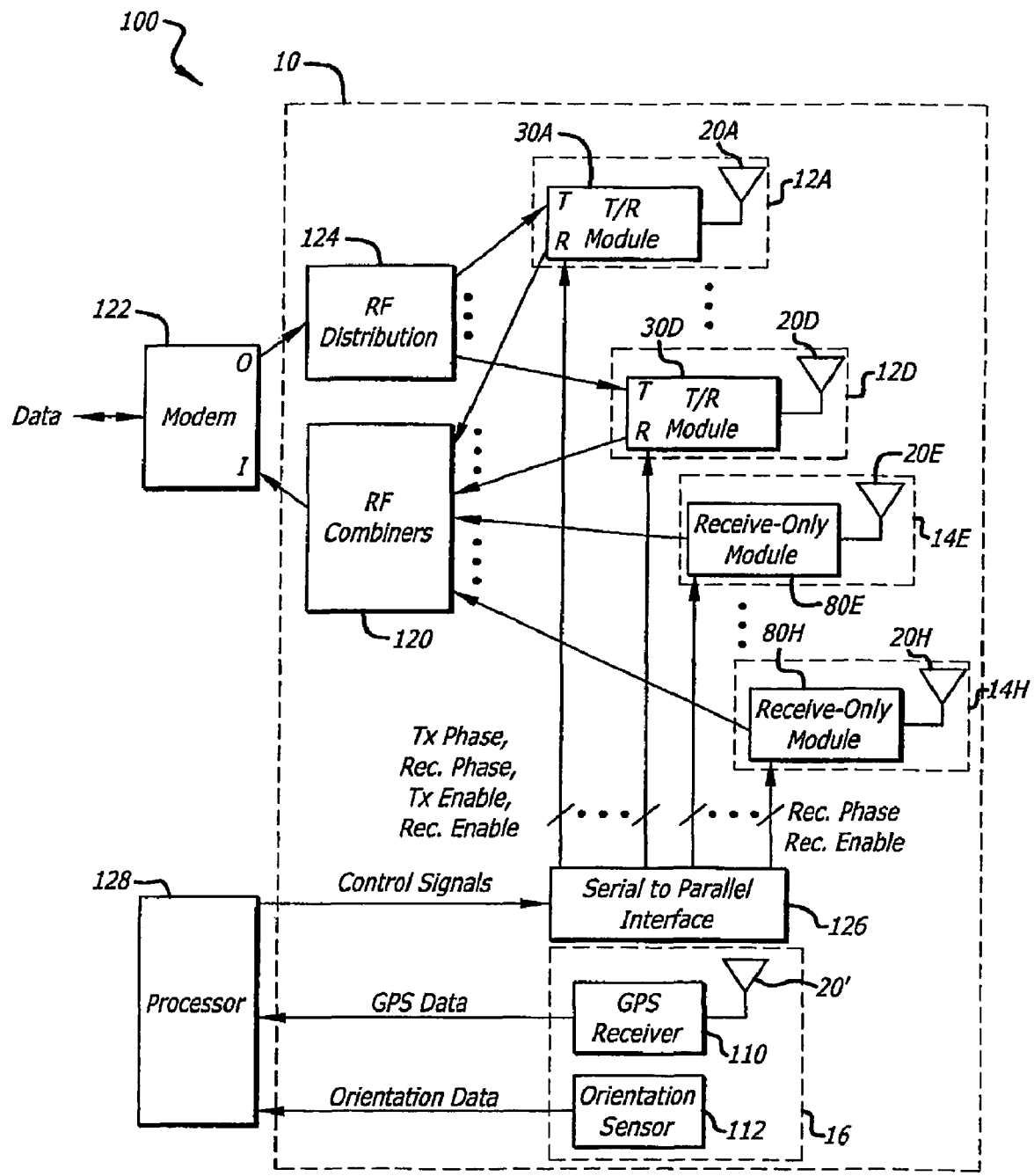
FIG. 4 is a simplified block diagram of a satellite communication system designed in accordance with an illustrative embodiment of the present invention.

FIG. 4 is a simplified block diagram of a satellite communication system 100 designed in accordance with an illustrative embodiment of the present invention. The system 100 includes a novel antenna array 10 as described above with reference to FIGS. 1-3. In the illustrative embodiment, the antenna 10 includes a phased array with eight radiating elements 20A-20H. Four radiating elements 20A-20D are each coupled to a T/R circuit 30A-30D, respectively, to form the T/R elements 12A-12D. The remaining four radiating elements 20E-20H are each coupled to a receive-only circuit 80E-80H, respectively, to form the receive-only elements 14E-14H.

The received signals output by each of the T/R circuits 30A-30D and receive-only circuits 80E-80H are fed to a receive manifold 120, which includes one or more RF combiners that combine the received signals to form a single output signal that is then demodulated by a modem 122 and output to the user. The modem 122 also modulates data from the user onto a carrier signal to form a transmit signal that is split by an RF distribution board 124 into four identical signals, each of which is fed to the transmit channel of each T/R module 30A-30D. The modem 122 may be connected to a user data terminal (such as a computer or laptop) via, for example, a wired connection (such as an Ethernet connection) or a wireless connection (such as a WiFi connection).

In a preferred embodiment, the antenna 10 also includes a serial to parallel interface 126 for coupling control signals (such as Tx. Phase, Rec. Phase, Tx. Enable, and Rec. Enable) to each T/R circuit 30A-30D and each receive-only circuit 80E-80H. An external computer or an embedded processor 128 provides the control signals via a serial input/output (to minimize the number of control leads). The serial to parallel interface 126, which may be implemented, for example, using a plurality of serially connected shift registers, then sends the control signals to the T/R circuits 30A-30D and receive-only circuits 80E-80H in parallel. In a preferred embodiment, the serial to parallel interface 126 and the processor 128 are integrated as part of the antenna/circuit board 90 to reduce the number of connectors between different parts of the system 100.

The processor 128 includes software for determining the receive and/or transmit phases of each antenna element 20A-20H and providing the appropriate control signals (Tx. Phase, Rec. Phase). Separate control signals are provided for each antenna element 20A-20H. Thus, in the illustrative embodiment, the processor 128 provides four Tx. Phase control signals (for the four T/R elements 12A-12D) and eight Rec. Phase control signals (for the four T/R elements 12A-12D and the four receive-only elements 14E-14H). The relative transmit phases of the antenna elements 20A-20D are chosen such that the overall transmit beam of the antenna array 10 points in a desired direction. Similarly, the relative receive phases of the antenna elements 20A-20H are chosen such that the overall receive beam of the antenna array 10 points in a desired direction.

In a preferred embodiment, antenna 10 is also equipped with a GPS and antenna orientation module 16, which, as described above, includes a GPS receiver 110 coupled to a GPS antenna 20' for obtaining the GPS coordinates of the antenna 10, and antenna orientation sensors 112 for measuring the orientation (or tilt) of the antenna 10. The processor 128 also includes software for calculating the relative direction of a visible communication satellite based on the antenna GPS coordinates and orientation (and satellite orbit information). The processor 128 can then automatically point the transmit and receive beams of the phased array in the direction of the satellite using beam steering techniques as described above. A method for determining the relative direction of a satellite using a GPS receiver and orientation sensors is disclosed in a patent application entitled "Method and System for Controlling the Direction of an Antenna Beam", filed Jan. 22, 2008, by R. W. Nichols et al. Ser. No. 12/017, 916, the teachings of which are incorporated herein by reference. Other methods may also be used without departing from the scope of the present teachings.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An antenna comprising:
a first subarray having a first number of antenna elements and a transmit circuit coupled to each antenna element in said first subarray, wherein each transmit circuit is adapted to receive a transmit control signal and in accordance therewith vary a relative phase of a signal transmitted by the coupled antenna element to steer an overall antenna transmit beam;
a second subarray having a second number of antenna elements and a receive circuit coupled to each antenna element in said second subarray, wherein each receive circuit is adapted to receive a receive control signal and in accordance therewith vary a relative phase of a signal received by the coupled antenna element to steer an overall antenna receive beam, wherein said second number is not equal to said first number and said first and second subarrays have at least one common antenna element and a transmit/receive circuit coupled to each common antenna element, wherein each transmit/receive circuit includes independently controlled receive and transmit circuits coupled to said common antenna element; and
means for combining signals received from each of said receive circuits to form a single output signal.

2. The invention of claim 1 wherein each transmit/receive circuit includes a diplexer for simultaneously coupling said receive and transmit circuits to said common antenna element.

3. The invention of claim 1 wherein said antenna further includes means for distributing an input signal to each of said transmit circuits.

4. The invention of claim 3 wherein said antenna further includes a serial to parallel interface adapted to receive a serial signal and output a plurality of control signals to each of said transmit and receive circuits in parallel.

5. The invention of claim 3 wherein each receive circuit also includes a low noise amplifier adapted to amplify said signal received by said antenna element.

6. The invention of claim 5 wherein each transmit circuit also includes a high power amplifier adapted to amplify an input signal for transmission by said antenna element.

7. The invention of claim 1 wherein said antenna elements are patch antennas comprising patch radiators disposed on a patch substrate over a ground plane.

8. The invention of claim 7 wherein said transmit and receive circuits are integrated onto a circuit board disposed next to and parallel with said ground plane.

9. The invention of claim 8 wherein each transmit circuit is aperture coupled to a patch radiator.

10. The invention of claim 8 wherein each receive circuit is aperture coupled to a patch radiator.

11. The invention of claim 8 wherein said antenna further includes a GPS antenna element adapted to receive Global Positioning System (GPS) signals.

12. The invention of claim 11 wherein said GPS element includes a patch antenna radiator disposed on said patch substrate.

13. The invention of claim 12 wherein said antenna further includes a GPS receiver coupled to said GPS antenna element.

14. The invention of claim 13 wherein said GPS receiver is integrated onto said circuit board.

15. The invention of claim 14 wherein said GPS receiver is aperture coupled to said GPS patch radiator.

16. The invention of claim 14 wherein said antenna further includes a sensor for measuring an orientation of said antenna.

17. The invention of claim 16 wherein said sensor is integrated onto said circuit board.

18. The invention of claim 16 wherein said sensor includes an electronic tilt sensor.

19. The invention of claim 16 wherein said sensor also includes a north finding module.

20. The invention of claim 1 wherein said first subarray is smaller than said second subarray.

21. The invention of claim 20 wherein said first subarray is a subset of said second subarray.

22. The invention of claim 21 wherein said first subarray is an N element by N element planar array, where N is an integer.

23. The invention of claim 22 wherein said second subarray includes said first subarray and one or more additional subarrays adjacent to said first subarray.

24. The invention of claim 23 wherein each additional subarray is an N element by one element planar array.

25. The invention of claim 24 wherein said second subarray includes two of said additional subarrays, wherein said additional subarrays are adjacent to two contiguous sides of said first subarray.

26. An antenna comprising:
a first subarray including a plurality of antenna elements and a transmit/receive circuit coupled to each antenna element, wherein each transmit/receive circuit includes independently controlled receive and transmit circuits simultaneously coupled to one of said antenna elements;
one or more additional subarrays adjacent to said first subarray; wherein each additional subarray includes one or more antenna elements and a receive-only circuit coupled to each antenna element of said additional subarray;
a distribution circuit adapted to receive an input signal and distribute said input signal to each of said transmit circuits of said first subarray; and
a combiner circuit adapted to combine signals received from each receive circuit and each receive-only circuit to form a single output signal.

27. An antenna comprising:
a patch substrate;
a plurality of radiating patches disposed on a first side of said substrate;
a ground plane disposed on a second side of said substrate;
a Global Positioning System (GPS) receiver coupled to one or more of said radiating patches; and
a phased array control circuit coupled to one or more of said radiating patches.

28. The invention of claim 27 wherein said phased array circuit is integrated onto a circuit board disposed next to and parallel with said ground plane.

29. The invention of claim 28 wherein said GPS receiver is integrated onto said circuit board.

30. The invention of claim 29 wherein said antenna further includes a sensor for measuring an orientation of said antenna.

31. The invention of claim 30 wherein said sensor is integrated onto said circuit board.

32. The invention of claim 31 wherein said sensor includes an electronic tilt sensor.

33. The invention of claim 32 wherein said sensor also includes a north finding module.

34. The invention of claim 27 wherein said phased array control circuit includes a receive circuit coupled to each of a plurality of radiating patches for controlling a relative receive phase of the radiating patch to steer an overall antenna receive beam.

35. The invention of claim 34 wherein said phased array control circuit includes a transmit circuit coupled to each of a subset of said radiating patches coupled to a receive circuit for controlling a relative transmit phase of the radiating patch to steer an overall antenna transmit beam.

36. A communication system comprising:
a first subarray including a first number of antenna elements and a transmit circuit coupled to each antenna element in said first subarray, each transmit circuit adapted to receive a transmit control signal and in accordance therewith vary a relative phase of a signal transmitted by the antenna element;
a second subarray including a second number of antenna elements and a receive circuit coupled to each antenna element in said second subarray, each receive circuit adapted to receive a receive control signal and in accordance therewith vary a relative phase of a signal received by the antenna element, wherein said second number is not equal to said first number and said first and second subarrays have at least one common antenna element;
a processor adapted to provide said transmit and receive control signals to steer an overall antenna transmit beam and an overall antenna receive beam, respectively;

a distribution circuit adapted to receive a transmit signal and distribute said transmit signal to each of said transmit circuits of said first subarray;

a combiner circuit adapted to combine signals received from each receive circuit to form a single output signal; and a modem adapted to receive input data and encode said data to form said transmit signal, and to decode said output signal to extract and output decoded data.

37. A method for communicating with a satellite including the steps of:

providing a first subarray having a first number of antenna elements and a transmit circuit coupled to each antenna element in said first subarray, wherein each transmit circuit is adapted to receive a transmit control signal and in accordance therewith vary a relative phase of a signal transmitted by the coupled antenna element;

providing a second subarray having a second number of antenna elements and a receive circuit coupled to each antenna element in said second subarray, wherein each receive circuit is adapted to receive a receive control signal and in accordance therewith vary a relative phase of a signal received by the coupled antenna element, wherein said second number is not equal to said first number and said first and second subarrays have at least one common antenna element and a transmit/receive circuit coupled to each common antenna element, wherein each transmit/receive circuit includes independently controlled receive and transmit circuits coupled to said common antenna element;

generating a transmit control signal for each of said transmit circuits to steer an overall antenna transmit beam toward said satellite;

generating a receive control signal for each of said receive circuits to steer an overall antenna receive beam toward said satellite;

distributing an input signal to each of said transmit circuits to transmit said input signal to said satellite; and combining signals received from each of said receive circuits to form a single output signal.

* * * * *